United States Patent [19]

Erlichman

[11] 4,198,135

[45] Apr. 15, 1980

[54] METHOD AND APPARATUS FOR RELEASING PROCESSING FLUID FROM A FLUID APPLICATOR BY APPLICATION OF THERMAL ENERGY

[75] Inventor: Irving Erlichman, Wayland, Mass.

[73] Assignee: Polaroid Corporation, Cambridge, Mass.

[21] Appl. No.: 26,909

[22] Filed: Apr. 4, 1979

[51] Int. Cl.² .............................................. G03C 11/00
[52] U.S. Cl. .................................. 352/130; 352/78 R
[58] Field of Search ...................... 352/72, 78 R, 130

[56] References Cited

U.S. PATENT DOCUMENTS

| | | |
|---|---|---|
| 3,396,650 | 8/1968 | Rubinstein et al. |
| 3,444,728 | 10/1967 | Macquarrie et al. |
| 3,593,643 | 7/1971 | Downey ............................ 352/130 |
| 3,767,297 | 10/1973 | Downey ............................ 352/130 |
| 3,871,013 | 3/1975 | Burke et al. ........................ 352/130 |
| 3,895,862 | 7/1975 | Stella et al. ........................ 352/130 |
| 3,951,530 | 4/1976 | Czumak et al. ................... 352/130 |
| 4,047,213 | 9/1977 | Land .................................. 352/130 |

*Primary Examiner*—Monroe H. Hayes
*Attorney, Agent, or Firm*—Leslie J. Payne

[57] ABSTRACT

Method and apparatus for releasing processing fluid from a fluid applicator within a film cassette by causing a sealed area of the applicator to open in response to a predetermined amount of thermal energy being applied thereto. Such applicator has a sealing device which device is responsive to the application of the predetermined thermal energy to open and release the fluid. A mechanism, for actuating the sealing device, is provided for facilitating application of such energy to the applicator.

21 Claims, 4 Drawing Figures

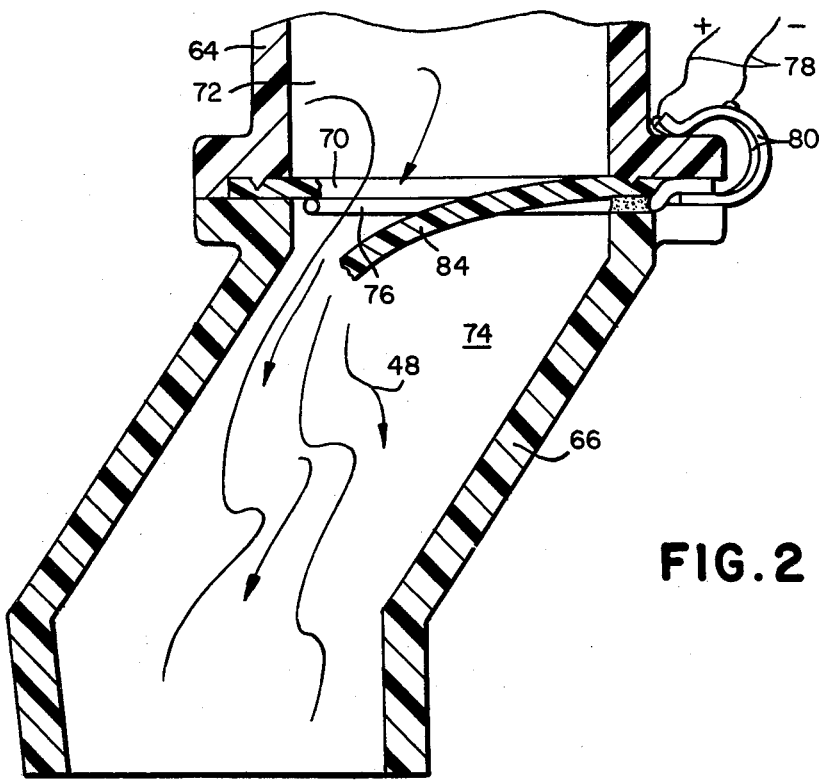
FIG. 2
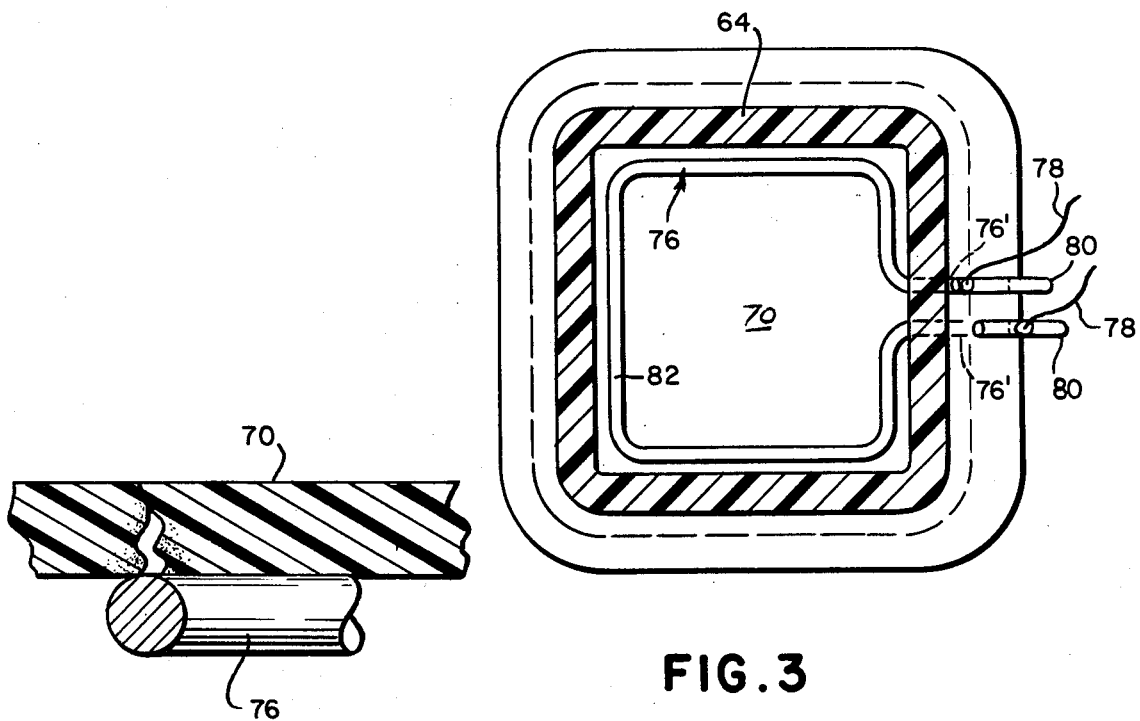
FIG. 3
FIG. 4

4,198,135

METHOD AND APPARATUS FOR RELEASING PROCESSING FLUID FROM A FLUID APPLICATOR BY APPLICATION OF THERMAL ENERGY

BACKGROUND OF THE INVENTION

This particular invention relates generally to film processing and, more particularly, it concerns a method and photographic film cassette having an improved fluid processing applicator system for releasing processing fluid on a strip of traveling film.

Multipurpose film cassettes for use in the motion picture art have been developed in which a strip of photographic film is selectively and sequentially operated to be exposed, processed and projected while at all times remaining in the cassette. Film cassettes of this type are disclosed in several U.S. patents assigned in common with the present invention.

Typically, such cassettes contain a supply of light-sensitive photographic film which is selectively exposable whenever the cassette is in a camera particularly adapted to receive and operate the same. To process or develop the exposed film, the cassette is removed from the camera. Thereafter it is placed in a player or processing and viewing apparatus capable of activating a cassette contained processor for effecting deposition of a processing fluid on the film's exposed emulsion surface as the latter is advancing therepast. During such processing a conventional series of successive, positive transparent images on the exposed film is developed. Following processing as indicated above, the player apparatus is operated as a projector, whereby the film is incrementally advanced, frame-by-frame, past a light source. In this manner, the series of positive transparent images of the scenes to which the film were exposed are capable of being successively viewed while being projected onto a screen.

It is clear that the advance in the motion picture art represented by such a system is apparent and needs no elaboration herein. However, for satisfactory cassette performance it is vital that the processing fluid be timely and effectively released from a cassette contained fluid processor onto the advancing film strip. Otherwise, delays and defects in the delivery of processing fluid may lead to an incomplete and nonuniform coating, thereby adversely affecting achievement of a uniform diffusion transfer on the film strip. It is to be understood that any defect in the processing operation is likely to cause permanent blemishes in the positive image transparencies carried on the film strip. It follows, therefore, that the achievement of effective fluid storage and timely fluid release onto the film strip during processing have been major focal points of attention in overall system development.

The current state of the art with respect to achieving the appropriate release of the processing fluid on such cassette contained film strip is represented by the disclosures of U.S. Pat. No. 3,871,013 issued Mar. 11, 1975 to Edward F. Burke and Douglas B. Holmes; U.S. Pat. No. 3,895,862 issued July 22, 1975 to Joseph A. Stella, Edward F. Burke, Jr. and Paul B. Mason; and U.S. Pat. No. 3,951,530 issued Apr. 20, 1976 to Frank M. Czumak, Paul B. Mason and Joseph A. Stella, all of which patents are commonly assigned with the present invention. In cassettes of the foregoing category, the processing fluid is stored in a closed reservoir or pod positioned within the film cassette. Use is made of a removable tear-tab closure for ensuring releaseable retention of the stored fluid. During the processing mode, the player apparatus activates the processor to cause the removable tear-tab closure to be opened. While the tear-tab closure successfully operates, it requires a relatively sophisticated mechanical cooperation between several cassette contained components. In this regard, the tear-tab is releasably bonded to a reservoir having a relatively large mouth so as to seal completely the opening. To effect removal of the tear-tab for opening the reservoir the former is provided with a folded back portion trained over a guide roller and connected to and movable with a pull strip. Removal commences when a latching tongue of the pull strip engages and moves with an aperture in the leader end of the film during rewinding of the exposed film strip back to the supply spool. Continued rewinding of the supply spool will produce a pulling action on the pull strip. This pull strip displacement is translated into corresponding displacement of the tear-tab, which by virtue of its configuration and connection, will be peeled from the reservoir to thereby enable the processing fluid to flow through a nozzle opening in the processor. Also in systems of this type, it is necessary to separate and store the tear-tab closure from the pull strip so as to avoid the tear-tab hampering the intended operation of the cassette as well as contaminate the strip as a result of contact with any portion of the tear-tab. Towards this particular end, the tear-tab closure is separated by a knife-like formation at the exit of a channel formed by internal cassette walls which walls also form a storage chamber for the separated closure. While the foregoing approach is successful in operation, it nevertheless is reliant upon several mechanical components and connections. This, however, gives rise to potential mechanical problems.

Other systems have been developed for releasing processing fluid from a reservoir housed in a film cassette without the use of a pull strip/tear-strip arrangement. One type of approach, such as described, for example, in U.S. Pat. No. 3,396,650 issued Aug. 13, 1968 to Leon Rubinstein and Arthur J. Sable; U.S. Pat. No. 3,344,728 issued Oct. 3, 1967 to Allan B. MacQuarrie and Arthur J. Sable; and U.S. Pat. No. 3,593,643 issued July 20, 1971 to Rogers B. Downey, has been directed to use a rupturable container which ruptures when a mechanical force applying member applies force thereto so as to increase the fluid pressure within the container to a preselected amount. Another approach is described in U.S. Pat. No. 3,767,297 issued Oct. 23, 1973 to Rogers B. Downey, wherein the processing fluid is released upon actuation of a solenoid operated plunger causing breakage of a frangible glass vial housing the fluid.

The novel arrangement as set forth herein is directed to the use of nonmechanical means for rupturing a fluid processing container, and preferably by the application of thermal energy. In this regard, although U.S. Pat. No. 4,047,213 issued Sept. 6, 1977 to Edwin H. Land discloses heating components positioned in the cassette, the heating is only directed to improving the diffusion transfer of photographic films after release of the fluid from the reservoir by a conventional pull strip/tear-tab arrangement.

SUMMARY OF THE INVENTION

In accordance with the present invention, the aforenoted potential for problems associated with release of processing fluid from a sealed reservoir of a cassette contained fluid applicator are substantially eliminated. Elimination is achievable by the provision of improved means for releasing processing fluid which is responsive to the application of predetermined levels of thermal energy to the fluid applicator.

As in prior fluid applicators of the type usable in photographic film cassettes, there is a sealable area capable of releasing processing fluid contained in the applicator on to the emulsion surface of a film for facilitating forming thereon a layer of such fluid. According to this invention, the applicator includes means for sealing the sealable area wherein the sealing means is responsive to the application of a predetermined level of thermal energy to the applicator to open and release the fluid. Also included are selectively operable means for facilitating the application of the predetermined level of thermal energy to the applicator to cause the sealing means to open the sealable area to thereby release the processing fluid.

In one embodiment, the sealing means includes a sealing membrane covering the sealable area of the applicator and which separates in response to the predetermined thermal energy level applied directly thereto. For directly applying such energy there is provided a heatable element positioned within, on, or at least relatively close to the membrane so that the energy is transferred thereto to cause the opening. Means are also provided to couple the heatable element to an electrical source of energy external to the cassette.

Among the objects of the invention are, therefore, the provision of an improved fluid applicator for use in a multipurpose film cassette which enables the selective and automatic releasing of processing fluid from a chamber in response to predetermined levels of thermal energy being applied to the applicator; the provision of an improved photographic film cassette wherein a fluid applicator has sealing means which releasably seals the fluid in the applicator until the applicator is heated to a predetermined level of thermal energy, and the provision of an improved method effective for automatically and selectively releasing processing fluid from the applicator by applying a predetermined thermal energy level to the processor.

Other objects and further scope of applicability of the present invention will become apparent from the detailed description to follow when taken in conjunction with the accompanying drawings wherein like parts are designated by like reference numerals throughout the several views.

BRIEF DESCRIPTION OF THE DRAWINGS

FIG. 2 is an enlarged diagrammatic view better illustrating details on the applicator shown in FIG. 1 and also showing rupture of the sealing membrane thereof;

FIG. 3 is an enlarged diagrammatic view of the embodiment shown in FIGS. 1 and 2 illustrating the positioning of a heating coil relative to the sealing membrane; and FIG. 4 is an enlarged diagrammatic view illustrating the manner by which the heating coil causes separation of the sealing membrane.

DETAILED DESCRIPTION OF THE INVENTION

Figure 1:
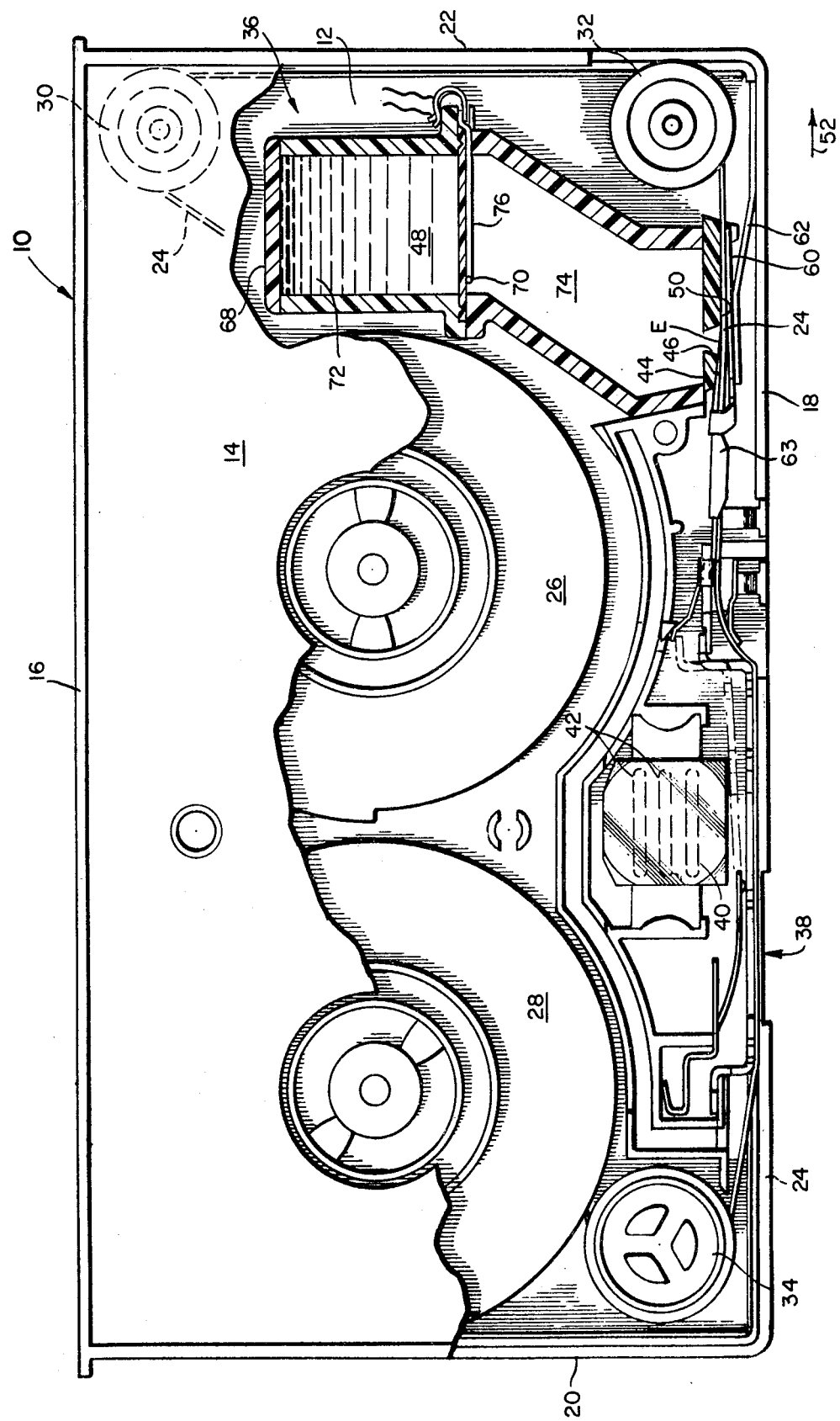
FIG. 1 is a side elevational view partially broken away and partially in cross-section, illustrating the interior of a photographic film cassette incorporating the improved fluid applicator of the present invention.

FIG. 1 of the drawings illustrates a multipurpose film cassette incorporating the principles of the present invention and is shown to include a cassette housing 10, taking the form of a rectangular parallelepiped having a pair of exterior side walls 12 and 14 connected together by top, bottom and end walls 16, 18, 20 and 22, respectively. Within the cassette housing 10, a film strip 24 is connected at opposite ends to supply and take-up spools 26 and 28, respectively, for movement through a series of linear flights or runs defined by a bobulator roller 30, an idler or guide roller 32 and a snubber roller 34. When the film strip 24 runs between the guide roller 32 and snubber roller 34, in passing from the supply spool 26 to the take-up spool 28, it traverses the improved processor or fluid applicator 36 of the present invention, and an exposure/projection aperture 38 is formed in the bottom housing wall 18. Positioned over the exposure/projection aperture 38 is a reflecting prism 40 which is located adjacent ventilating openings formed in the side wall 12.

Also, in accordance with disclosures of prior patents, including the ones mentioned above, as the film strip 24 runs between the rollers 32 and 34, it passes beneath the bottom of a processor nozzle structure 44. In the illustrated embodiment, the nozzle 44 is an integral molding of suitable synthetic resinous material. Extending from top to bottom is a generally rectangular shaped nozzle opening 46 through which the processing fluid 48 is released onto the upper surface of an emulsion layer E carried by and extending across the width of the film strip 24. Details regarding the nozzle structure 44 and its cooperation with the film strip 24 during operation of the cassette need not be given insofar as such details are adequately disclosed in the above mentioned patents. Consequently, only that structure relevant for adequately describing this invention will be set forth. A doctoring surface 50 is provided downstream of the nozzle opening 46 (as viewed in the context of film strip advancement in the processing or rewind direction indicated by arrow 52. The doctoring surface 50 is formed by a generally planar, inclined surface extending transversely between a pair of spaced apart land surfaces or guide tracks (not shown), and has a preselected spacing (not shown) relative to the film strip 24, so as to effect formation of a uniform layer of processing fluid on the emulsion layer E.

As the film strip 24 progressively advances beneath the nozzle 44, it is supported by a pressure pad 60 which is in turn biased upwardly by a cantilevered type spring 62 staked to and supported by the bottom wall 18. Both the pressure pad 60 and the pressure pad spring 62 essentially serve to continuously maintain successive incremental portions of the film strip 24 in engaging relation with the nozzle 44 just below the nozzle opening 46 so that the film strip assumes a desired spaced gap relationship to the doctoring surface 50. Also, the biased pressure pad 60 minimizes distortion of the film strip 24.

Positioned upstream of the nozzle 44 (in the context of film strip travel in the rewind or processing direction 52) is a valve member 63. To be advanced from the position shown to a position (not shown) underlying the nozzle 44 at the end of the processing cycle, such valve member 63 is engageable by a necked-down segment (not shown) in the leading end portion of the film strip 24.

For more clearly describing the applicator 36 continued reference is made to FIGS. 1-4. As seen the applicator 36 includes vertically stacked hollow housing members 64 and 66. For sealing the open upper end of the housing member 64, a flat plastic cap 68 is heat-sealed thereto. Affixed to the nozzle structure 44 is the bottom end of the housing member 66. Hermetically sealed to the housing member 62 is a generally flat thermoplastic sealing membrane 70. In the assembled condition the sealing membrane 70 seals a sealable area defined between a pair of juxtaposed and communicable chambers 72 and 74. Stored in the upper chamber 72 is the processing fluid 46 which is effectively released in a manner to be mentioned. For facilitating quick release of the processing fluid 46, such fluid is pressurized to a suitable value above atmospheric pressure. As a consequence, when the sealing membrane 70 ruptures or separates the processing fluid 48 will forcefully flow, due to the pressure differential. Further in this regard, the sealing membrane 70 when hermetically sealed is placed in a prestressed condition. In this manner the prestressing enhances physical rupture or separation. Joining the housing members 64 and 66 together is accomplished by ultrasonic welding their abutting flanges together. Other techniques for joining together the housing members 64 and 66 can be utilized.

Referring back again to the sealing membrane 70 it is, in the present embodiment, made of polyethylene. Polyethylene is used because it is impervious to fluid and will melt in response to relatively low temperature. To selectively heat the sealing membrane 70, a continuous heating coil element 76 is positioned in engagement with its underside surface. In this regard see FIG. 4. Each of the opposite terminating ends 76 of the heating element 76 is connected to leads 78 by a C-shaped, snap-on electrical connector 80 which is attached to the flange of the housing member 64 as shown in FIGS. 2 and 3 so as to provide means for connecting the heating element 76 to an external source of electric power in the player apparatus (not shown).

In practice, the heating element 76 can be made of a high-resistive material, such as nichrome, steel, carbon ink, etc., which when heated will cause the fusing or melting of the polyethylene in the region adjacent the sealing membrane 70. Not only is separation of the polyethylene sealing membrane 70 effectuated by fusing, but also because of the noted internal prestress of the membrane, weight of the processing fluid 48, and stresses incident to heating. Thus mechanical force applying systems and the like for releasing the processing fluid are eliminated. Although polyethylene can be used, it is consistent with the invention that other fluid impervious materials having low melting temperatures can be used. For purposes of illustration and not limitation, successful separation or rupture of the polyethylene sealing membrane 70 can be achieved if the thickness of the membrane is 0.001" and the heating temperature is between about 200° F. to 300° F. For expediting quick release and for minimizing energy consumption, it has been found that the noted temperature can be applied for about 150 to 250 milliseconds. Thus, the sealing membrane 70 acts as a means for sealing the chamber 72 which is responsive to the application of a predetermined amount of thermal energy to separate or rupture so as to release the processing fluid 48.

With continued reference to FIG. 3, it will be seen that the heating element 76 has an open loop configuration 82 positioned between aligned openings of the housing members 64 and 66. End portions 76' of the heating element 76 narrow together as they extend from the housing members 64 and 66. Owing to this configuration when the sealing membrane 70 ruptures, it will rupture in the region immediately adjacent the heating element 76 so that a flap 84 conforming to the loop configuration will form. This flap 84 will be pushed downwardly as a result of the pressurized fluid 48 flowing toward the nozzle 44. Because of the relatively large area defined by the flap 84, the highly viscous processing fluid 48 more readily flows, thereby facilitating its effective removal from the upper chamber 72. Moreover, such heating advantageously improves flowability of the processing fluid 56, lowering its viscosity. Thus, the heating element 76 provides selectively operable means for facilitating application of a predetermined level of thermal energy to the sealing membrane 70.

To provide a more complete understanding of the processor 36 the overall operation of the cassette will now be briefly explained. Prior to operation, it will be recalled that the unexposed film strip 24 will be essentially entirely contained on the supply spool 26 with a portion extending about the rollers 30, 32 and 34 with a leader attached to the take-up spool 28. Exposing of the film strip 24 is achieved after placing the cassette housing 10 in a camera (not shown) which is adapted to receive and operate the same. Operation of the camera will result in the film strip 24 being selectively exposed as it is incrementally advanced past the exposure/projection aperture 38 to the take-up spool 28 in the forward or exposure direction (opposite the processing direction 52). For effecting processing of the exposed film strip 24, the cassette housing 10 is removed from the camera and appropriately inserted into the player apparatus which is operable in either a processing mode or projecting mode to correspondingly operate the cassette in the noted operational modes. During operation the player initially rewinds the film strip 24 and at the same time electrically energizes the heating element 76. As a consequence, the electric power causes the heating element 76 to be heated to a preselected temperature level in the range earlier noted, whereupon the polyethylene sealing membrane 70 will tear or rupture along the configuration defined the heating element. This, as noted, takes place as a result of the sealing membrane 70 melting and the combination of, for example, the prestresses, expansion stresses and weight of the processing fluid 48.

Since the polyethylene sealing membrane 70 will separate or rupture along the configuration of heating element 76 the flap 84 will be forced downwardly, thereby freeing the processing fluid 48 for flow through the housing 66 toward the nozzle opening 46 and eventually onto the emulsion layer E. Uniform distribution of the processing fluid 48 will be obtained by action of the doctoring surface 50. Other devices are contemplated for purposes of heating the sealing membrane 70 to a predetermined energy level.

Thus, it will be appreciated that as a result of this invention an improved fluid applicator is provided for photographic film cassettes by which the above mentioned objectives are completely fulfilled. Also, it will be apparent to those skilled in the art that modifications and/or changes may be made in the illustrated embodiments without departure from inventive concepts manifested thereby. Accordingly, it is expressly intended that the foregoing description is of preferred embodiments only, not limiting, and that the true spirit and scope of the present invention be determined by reference to the appended claims.

What is claimed is:

1. In a photographic film cassette containing a strip of film having a light sensitive emulsion surface and a fluid processing applicator containing processing fluid and having a sealable area capable of releasing the fluid onto the emulsion surface for facilitating forming a layer of processing fluid thereon, the improvement comprising:

said applicator including means for sealing its said sealable area, said sealing means being responsive to the application of a predetermined level of thermal energy to said applicator to open and release said fluid; and selectively operable means for facilitating the application of said predetermined level of thermal energy to said applicator to cause said sealing means to open said sealable area to thereby release the processing fluid.

2. The cassette of claim 1 wherein said sealing means comprises a sealing membrane sealing said sealable area of said applicator and which separates in response to said predetermined thermal energy level being applied thereto.

3. The cassette of claim 2 wherein said selectively operable means comprises a heatable element positioned at least relatively close to said membrane such that said predetermined thermal energy of said element is transferred to said membrane to cause an opening to be formed therein and means for coupling said element to an electrical source of energy external to said cassette.

4. The cassette of claim 3 wherein said heatable element comprises a material which generates said predetermined thermal energy in response to electric power being applied thereto.

5. The cassette of claim 1 wherein said sealing means includes a meltable, thermally stressable and prestressed sealing membrane having the peripheral portion thereof affixed to said processor, said membrane opens as a result of the combination of thermal stresses, melting and the prestresses.

6. The cassette of claim 2 wherein said sealing membrane upon reaching said predetermined heat melts to thereby separate and release the fluid.

7. The cassette of claim 6 wherein said sealing membrane is comprised of a thin thermoplastic sheet.

8. The cassette of claim 7 wherein said thermoplastic material is polyethylene.

9. The cassette of claim 2 wherein said sealing membrane is in a prestressed condition.

10. The cassette of claim 3 wherein said heatable element has a relatively open loop-like configuration encompassing a relatively large surface area of said sealing membrane to cause separation of said membrane about said surface area while keeping said separated membrane connected to said processor.

11. In a fluid applicating apparatus for use in a film cassette said apparatus having means defining a reservoir for containing a processing fluid and having a sealable area which when sealed retains the fluid in said reservoir and means operatively connected to said containing means for depositing released fluid from said reservoir onto a surface of an elongated film strip, the improvement comprising:

a sealing membrane connected to said containing means which releasable seals the fluid in said reservoir, said sealing membrane being made of a material which separates in response to a predetermined amount of heat to release the fluid for flow towards said depositing means; and selectively operable means operatively connected to said sealing membrane and being selectively operable for facilitating application of said predetermined heat to preselected regions of said sealing membrane to cause separation of said membrane in said regions so as to allow release of the processing fluid from said containing means.

12. The apparatus of claim 10 wherein said sealing membrane is constructed to separate by melting in said regions upon reaching said predetermined heat.

13. The apparatus of claim 11 wherein said sealing membrane is connected to said containing means and prestressed such that upon said regions reaching said predetermined heat separation will occur as a result of the combination of melting action as well as the prestresses.

14. The apparatus of claim 12 wherein said sealing membrane is comprised of a thin thermoplastic sheet.

15. The apparatus of claim 13 wherein said thermoplastic sheet is polyethylene.

16. The apparatus of claim 12 wherein said means for facilitating said predetermined heat includes a heatable element connected to a surface of said sealing membrane and capable of generating said predetermined heat in response to electric power being applied thereto, and means for applying electric power to said heatable element.

17. The apparatus of claim 15 wherein said heatable element has a relatively open loop-like configuration encompassing a relatively large surface area of said sealing membrane to cause separation of said membrane about said surface area while keeping said separated membrane connected to said containing means.

18. The apparatus of claim 10 wherein said containing means includes the processing fluid contained in said reservoir which is pressurized to a preselected value in excess of atmospheric pressure whereby said pressurized fluid upon opening of said sealing membrane and exposure to atmospheric pressure will flow with force from said reservoir.

19. The method of releasing processing fluid from a fluid processor containing processing fluid in a reservoir having a sealable area sealed by a sealing means and capable of rupturing to release the fluid onto an emulsion surface of a photographic film strip movable in a film cassette in response to a predetermined amount of thermal energy being applied thereto, the improvement comprising the step of:

applying said predetermined thermal energy to said processor for causing opening of the sealing device and the sealable area to allow release of the processed fluid.

20. The method of claim 18 including the preliminary step of using a sealing membrane which melts in response to being heated to said predetermined thermal energy level, and said step of applying said energy is performed by applying said thermal energy level directly to the sealing membrane so as to heat the membrane to said predetermined energy.

21. The method of claim 18 further comprising the preliminary step of:

pressurizing the processing fluid in the reservoir to a value exceeding ambient pressure so that upon opening the sealing means the pressurized fluid flows forcefully therethrough.

* * * * *